United States Patent
Cosby et al.

(10) Patent No.: US 11,755,438 B2
(45) Date of Patent: Sep. 12, 2023

(54) AUTOMATIC FAILOVER OF A SOFTWARE-DEFINED STORAGE CONTROLLER TO HANDLE INPUT-OUTPUT OPERATIONS TO AND FROM AN ASSIGNED NAMESPACE ON A NON-VOLATILE MEMORY DEVICE

(71) Applicant: Lenovo Enterprise Solutions (Singapore) Pte. Ltd., Singapore (SG)

(72) Inventors: David W. Cosby, Raleigh, NC (US); Theodore B. Vojnovich, Raleigh, NC (US); Manjunatha Hebbar, Bangalore (IN); Anthony C. Yu, Cary, NC (US); Patrick L. Caporale, Cary, NC (US)

( * ) Notice: Subject to any disclaimer, the term of this patent is extended or adjusted under 35 U.S.C. 154(b) by 212 days.

(21) Appl. No.: 17/219,212

(22) Filed: Mar. 31, 2021

(65) Prior Publication Data

US 2022/0318106 A1 Oct. 6, 2022

(51) Int. Cl.
*G06F 11/20* (2006.01)
*G06F 13/40* (2006.01)
*G06F 3/06* (2006.01)

(52) U.S. Cl.
CPC .......... *G06F 11/2092* (2013.01); *G06F 3/061* (2013.01); *G06F 3/0659* (2013.01); *G06F 3/0688* (2013.01); *G06F 13/4027* (2013.01); *G06F 2201/85* (2013.01)

(58) Field of Classification Search
CPC ...... G06F 3/061; G06F 3/0659; G06F 3/0688; G06F 11/2092; G06F 13/4027; G06F 2201/85; G06F 3/0604; G06F 3/0644; G06F 3/067
See application file for complete search history.

(56) References Cited

U.S. PATENT DOCUMENTS

| | | | | |
|---|---|---|---|---|
| 7,949,893 B1 * | 5/2011 | Knaus | ................. | G06F 11/2092 714/4.11 |
| 8,171,247 B2 * | 5/2012 | Helliker | .............. | G06F 11/1446 714/6.1 |
| 9,602,590 B1 * | 3/2017 | Lu | ........................... | H04L 67/10 |
| 10,365,845 B1 * | 7/2019 | Foley | ................. | G06F 11/1076 |
| 11,232,003 B1 * | 1/2022 | Chinmay | ............. | G06F 11/201 |
| 11,442,669 B1 * | 9/2022 | Frandzel | ............... | G06F 3/0619 |
| 2006/0026329 A1 * | 2/2006 | Yu | ........................ | G06F 13/364 710/309 |

(Continued)

*Primary Examiner* — Matthew M Kim
*Assistant Examiner* — Matthew N Putaraksa
(74) *Attorney, Agent, or Firm* — Jeffrey L. Streets; Streets Lawfirm PC

(57) ABSTRACT

An orchestration controller in a storage solution may establish namespaces, assign each namespace to a host, and establish software-defined storage controllers to handle input-output operations between the hosts and the namespaces. Each namespace is assigned to a given host and the input-output operations to and from the namespace are handled by a specific primary software-defined storage controller. In response to failure of the software defined controller, a secondary software-defined storage controller will take over handling of the input-output operations to and from the namespace. Also, in response to the failure of the software-defined storage controller, the host will direct subsequent input-output operations destined for the namespace to the secondary software-defined storage controller.

20 Claims, 6 Drawing Sheets

(56) References Cited

U.S. PATENT DOCUMENTS

| | | | |
|---|---|---|---|
| 2011/0022882 A1* | 1/2011 | Jaehde | G06F 11/2035 |
| | | | 714/E11.073 |
| 2012/0265910 A1* | 10/2012 | Galles | G06F 11/2005 |
| | | | 710/300 |
| 2013/0111075 A1* | 5/2013 | Sato | G06F 13/4022 |
| | | | 710/16 |
| 2016/0267050 A1* | 9/2016 | Supnik | G06F 15/167 |
| 2017/0155573 A1* | 6/2017 | Khemani | H04L 41/0663 |
| 2019/0114102 A1* | 4/2019 | Chen | G06F 3/0631 |
| 2019/0354302 A1* | 11/2019 | Enz | G06F 3/061 |
| 2020/0012452 A1* | 1/2020 | Bannur Subraya | G06F 3/0611 |
| 2020/0050402 A1* | 2/2020 | Furey | G06F 3/0659 |
| 2020/0117556 A1* | 4/2020 | Zou | G06F 11/2082 |
| 2021/0365257 A1* | 11/2021 | Gopalapura Venkatesh | |
| | | | G06F 16/2365 |
| 2021/0397373 A1* | 12/2021 | Muthiah | G06F 9/485 |
| 2021/0397374 A1* | 12/2021 | Agarwal | G06F 9/542 |
| 2021/0397511 A1* | 12/2021 | Rozen | G06F 11/076 |
| 2022/0129181 A1* | 4/2022 | Morabad | G06F 3/0604 |
| 2022/0188178 A1* | 6/2022 | Bert | G06F 3/0619 |
| 2022/0231905 A1* | 7/2022 | Dhatchinamoorthy | |
| | | | H04L 67/1048 |
| 2022/0382616 A1* | 12/2022 | Brych | G06F 3/0659 |

* cited by examiner

AUTOMATIC FAILOVER OF A SOFTWARE-DEFINED STORAGE CONTROLLER TO HANDLE INPUT-OUTPUT OPERATIONS TO AND FROM AN ASSIGNED NAMESPACE ON A NON-VOLATILE MEMORY DEVICE

BACKGROUND

The present disclosure relates to the operation of a software-defined storage controller handling input-output operations for a non-volatile memory device.

BACKGROUND OF THE RELATED ART

High availability storage solutions may use dual storage controllers that are connected by a cable to two or more disk drives or disk drive arrays. Each physical storage controller may have two input/output ports and each disk drive may have two input/output ports. Accordingly, each storage controller may be directly connected to each disk drive and may have access to the entire storage space of each disk drive. In some configurations, the two physical storage controllers are both active and each handle some portion of the input-output operations for the connected disk drives. In other configurations, it may be less complicated to operate the dual controllers with one of the physical storage controllers in an active mode and the other in a standby mode. In the event that there is a failure of one of the active storage controllers or a connectivity path that is necessary for one of the active storage controllers to access one or more of the disk drives, the other of the two storage controllers may take over handling of the input-output operations of the failed storage controller. This failover of the input-output operations for handling by the remaining storage controller may occur automatically in response to the failure of the other storage controller that was previously handling these input-output operations.

While these configurations of the dual physical storage controllers may be effective to avoid a complete loss of access to some of the disk drives, the capacity of a single storage controller to handle input-output operations is fixed. Accordingly, the single remaining functional storage controller may be expected to handle approximately twice the load of input-output storage operations and may become a bottleneck in the use of the disk drives. While the physical storage controllers may be designed with sufficient capacity and speed to handle the increased load, it is inefficient for each storage controller to have twice the capacity that it is expected to handle during normal operation of the dual storage controllers.

A flash drive may perform input-output operations much faster than the physical storage controllers. Even the highest performing controllers available are challenged to deliver the input/output operations per second (IOPS) and throughput afforded by a reasonably small number of flash disks. These controllers are a natural bottleneck even when both controllers are serving input/output operations and are very constrained if one controller fails. Furthermore, increases the IOPS and data storage capacity have led to a substantial growth in the number of users and the number of connections. Any disruption in a storage controller or connectivity path that handles half of the total input/output capacity of the storage solution will be very disruptive and will require substantial resources to recover and reconnect.

BRIEF SUMMARY

One embodiment provides a computer program product comprising a non-volatile computer readable medium and non-transitory program instructions embodied therein, the program instructions being configured to be executable by a processor to cause the processor to perform various operations. The operations may include causing a non-volatile memory device to establish a plurality of namespaces including a first namespace and a second namespace, wherein each namespace is uniquely associated with at least a specific portion of the storage space of the non-volatile memory device, and assigning, for each of the plurality of namespaces, a host to access the namespace, including assigning a first host to access the first namespace and a second host to access the second namespace. The operations may further include establishing a plurality of software-defined storage controllers including a first software-defined storage controller and a second software-defined storage controller, wherein each software-defined storage controller has access to the plurality of namespaces over a drive interface fabric and has access to the hosts assigned to the plurality of namespaces over a host interconnect fabric. The operations may further include causing the first software-defined storage controller to handle input-output operations to and from the first namespace, and causing the second software-defined storage controller to handle input-output operations to and from the second namespace. Still further, the operations may include causing, in response to failure of the second software defined controller, the first software-defined storage controller to take over handling of the input-output operations to and from the second namespace, and causing, in response to failure of the second software-defined storage controller, the second host to direct input-output operations destined for the second namespace to the first software-defined storage controller.

One embodiment provides an apparatus comprising at least one non-volatile storage device storing program instructions and at least one processor configured to process the program instructions, wherein the program instructions are configured to, when processed by the at least one processor, cause the apparatus to perform various operations. The operations may include causing a non-volatile memory device to establish a plurality of namespaces including a first namespace and a second namespace, wherein each namespace is uniquely associated with at least a specific portion of the storage space of the non-volatile memory device, and assigning, for each of the plurality of namespaces, a host to access the namespace, including assigning a first host to access the first namespace and a second host to access the second namespace. The operations may further include establishing a plurality of software-defined storage controllers including a first software-defined storage controller and a second software-defined storage controller, wherein each software-defined storage controller has access to the plurality of namespaces over a drive interface fabric and has access to the hosts assigned to the plurality of namespaces over a host interconnect fabric. The operations may further include causing the first software-defined storage controller to handle input-output operations to and from the first namespace, and causing the second software-defined storage controller to handle input-output operations to and from the second namespace. Still further, the operations may include causing, in response to failure of the second software defined controller, the first software-defined storage controller to take over handling of the input-output operations to and from the second namespace, and causing, in response to failure of the second software-defined storage controller, the second host to direct input-output operations destined for the second namespace to the first software-defined storage controller.

DETAILED DESCRIPTION

Figure 1:
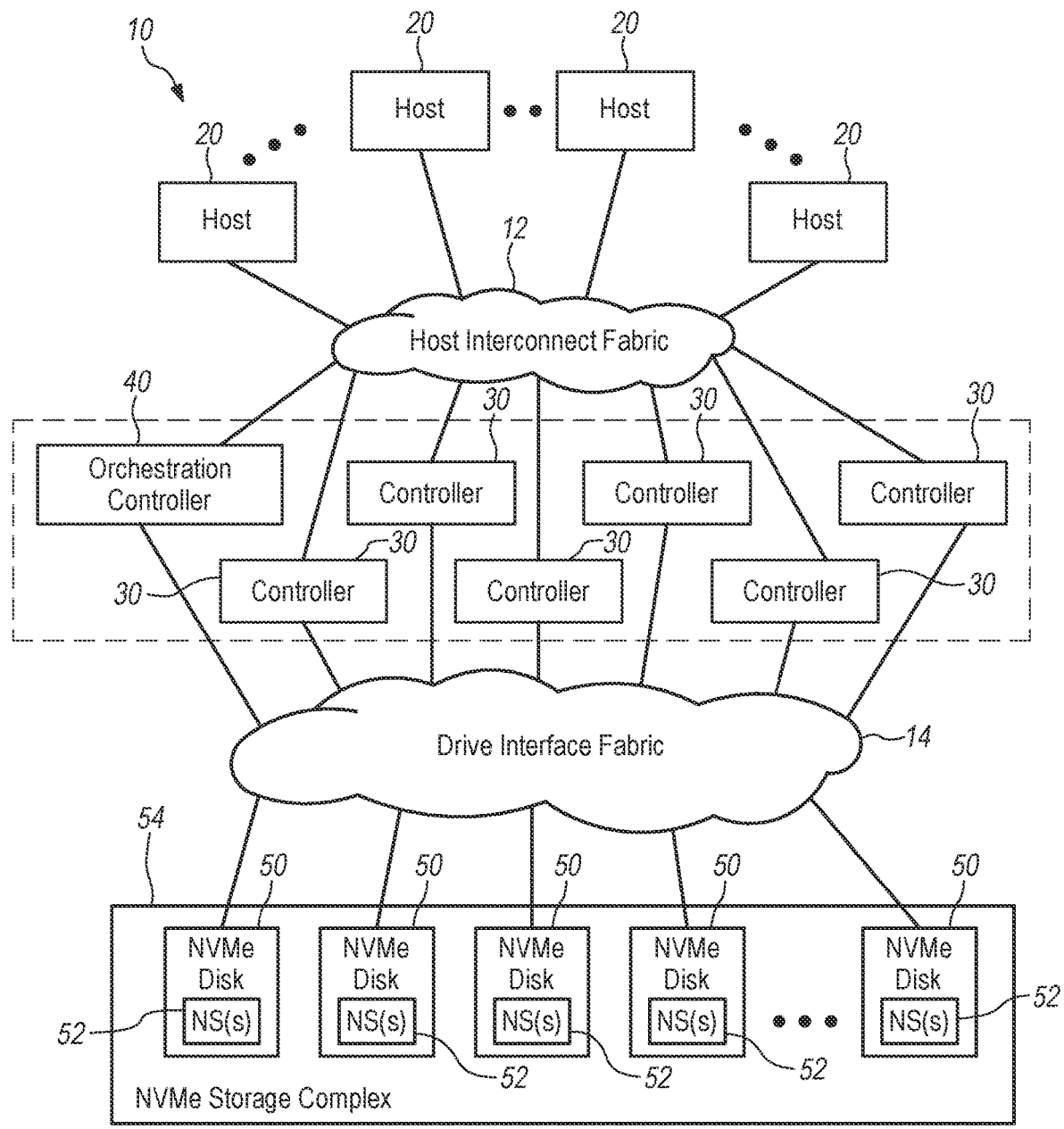
FIG. 1 is a diagram of a computing system including hosts, software-defined storage controllers and NVMe disks.

One embodiment provides a computer program product comprising a non-volatile computer readable medium and non-transitory program instructions embodied therein, the program instructions being configured to be executable by a processor to cause the processor to perform various operations. The operations may include causing a non-volatile memory device to establish a plurality of namespaces including a first namespace and a second namespace, wherein each namespace is uniquely associated with at least a specific portion of the storage space of a non-volatile memory device, and assigning, for each of the plurality of namespaces, a host to access the namespace, including assigning a first host to access the first namespace and a second host to access the second namespace. The operations may further include establishing a plurality of software-defined storage controllers including a first software-defined storage controller and a second software-defined storage controller, wherein each software-defined storage controller has access to the plurality of namespaces over a drive interface fabric and has access to the hosts assigned to the plurality of namespaces over a host interconnect fabric. The operations may further include causing the first software-defined storage controller to handle input-output operations to and from the first namespace, and causing the second software-defined storage controller to handle input-output operations to and from the second namespace. Still further, the operations may include causing, in response to failure of the second software defined controller, the first software-defined storage controller to take over handling of the input-output operations to and from the second namespace, and causing, in response to failure of the second software-defined storage controller, the second host to direct input-output operations destined for the second namespace to the first software-defined storage controller.

A non-volatile memory (NVM) device provides a type of computer memory that can retain stored information even after power has been turned off. Non-volatile memory devices may be referred to as flash memory or solid-state drives. One example of a non-volatile memory device is a Non-Volatile Memory Express (NVMe) disk. Furthermore, an NVMe storage array may include one or more NVMe disks. NVM Express (NVMe) or Non-Volatile Memory Host Controller Interface Specification (NVMHCIS) is an open logical-device interface specification for accessing non-volatile storage media attached via a PCI Express (PCIe) bus. Furthermore, the NVMe over Fabrics (NVMe-oF) protocol enables NVMe storage commands to be transferred between two nodes over an InfiniBand or Ethernet network that uses remote direct memory access (RDMA) technology.

A namespace is a quantity of storage space that can be formatted into logical blocks. A given namespace may have any quantity of storage space that is suitable for a host that is authorized to store data on the namespace. A given non-volatile memory (NVM) device may include any number of namespaces from a single namespace to as many namespaces as there are logical blocks in the non-volatile memory (NVM) device. Furthermore, the one or more namespaces on a non-volatile memory (NVM) device may utilize some or all of the non-volatile memory (NVM) device. Still further, one or more namespaces may include storage space on multiple non-volatile memory (NVM) devices. A namespace may be utilized to facilitate and limit (i.e., granulize) the extent of access that is available to a host.

A host may be a process or application that runs on a computing node, such as a standalone computer, one or more servers, or in a virtual machine. A host may have data storage requirements and may be assigned a namespace for storing its data. When a host has been assigned to a namespace or a namespace has been assigned to a host, an operation (i.e. a read or write command) that is sent from the host to the memory device will include a namespace tag in a header of the read or write communication. Therefore, the header informs the storage controller of the identity of the specific namespace to which the read or write operation should be directed. So, by configuration, the storage controller knows to which namespace operations should be directed based on the configuration assignment.

A software-defined storage controller refers to an instance of computer data storage software for managing data storage. The software-defined storage controller is independent of the underlying hardware. The software-defined storage controller may operate in a storage virtualization environment to separate the physical data storage hardware, such as an NVM disk, from the software that manages the physical data storage hardware. The software enabling a software-defined storage controller may also provide policy management for features such as data deduplication, data redundancy, snapshots and backup. A software-defined storage controller may run on any of the available compute nodes in a computer system that is able to communicate with the both the host (i.e., the owner and source of the data) and the physical data storage hardware. The compute node running the software-defined storage controller may be a standalone computer or a server in a datacenter. Optionally, the software-defined storage controller may be run in a daemon of a standalone computer or in a virtual machine within a virtualization environment. For example, a virtual machine may be supported by a hypervisor running on a server. Furthermore, it is an option, but not a requirement, to have as many software-defined storage controllers as there are namespaces. The number of software-defined storage controllers per physical storage device may be greater than one, is not limited or fixed, and may vary from one physical storage device to another. In some embodiments, a system may include one or more hardware storage controllers, either replacing the software-defined controllers or being used in conjunction with software-defined controllers.

In some embodiments, an orchestration controller may perform some or all of the operations in accordance with the program instructions. For example, the orchestration controller may establish and control certain operations of the software-defined storage controllers and may manage the namespace to controller mapping. The orchestration controller may establish a software-defined storage controller by provisioning an instance of the software-defined storage controller to a compute node. During operation of the software-defined storage controller, the orchestration controller may monitor and communicate with each software-defined storage controller. For example, the orchestration controller may monitor the operational status of the software-defined storage controller, the load of input-output operations being handled by the software-defined storage controller, and/or a performance metric for the software-defined storage controller.

In some embodiments, the orchestration controller may be a process or application running on a standalone computer, server in computing system, virtual machine in a virtualization environment, or any other available computing entity that has sufficient processing capability to run the application, as well as access to the software-defined storage controllers over the network fabric. For example, the entity or entities may be selected from a designated management entity, such as a system management server or other cloud computer, or a baseboard management controller (BMC). The designated management entity may be designated by an election process in a large computer system, whereas the BMC may be preferable in a small computer system. Optionally, an elected management entity may have full redundancy, deadman oversight, re-election capability, and/or other features.

The orchestration controller may assign a namespace to a software-defined storage controller for handling of input-output operations for the namespace. In addition, the orchestration controller may subsequently reassign a namespace to a different software-defined storage controller (i.e., may remove a namespace from management of one software-defined storage controller and assign the namespace to another software-defined storage controller). For example, the orchestration controller may reassign a namespace to a different software-defined storage controller in order to improve the balance of load among the plurality of software-defined storage controllers and/or to maintain a certain quality of service for the input-output operations for a namespace. Optionally, the orchestration controller may manage the number of hosts accessing a given controller to balance the number of hosts per controller. Furthermore, the assignment of particular namespaces to particular controllers may be managed to balance an amount of a disk access load directed through each controller. Similarly, any predetermined failover rules may be established so that one or more failure events are unlikely to lead to a large increase of load on any one controller.

The assignment of a namespace to a particular controller is handled by software, such that the association between a given namespace and the controller assigned to manage namespace is easy to change and may only be temporary. By updating a "namespace to controller" mapping, a new load balancing methodology is enabled. For example, if a controller is overloaded, the controller responsibilities of one of the many namespaces it manages can be assigned to another controller with a fairly simple update of the namespace/controller table. The "namespace to controller mapping" may be a virtual table that may be maintained by the orchestration controller and may be provided to, or made accessible to, some or all of the software-defined storage controllers.

When a namespace is reassigned from a first software-defined storage controller to a second software-defined storage controller, the host that is using the namespace for data storage must subsequently direct input-output operations destined for the namespace to the second software-defined storage controller that is currently handling input-output operations for the namespace. In one option, the orchestration controller may inform the host of any change of the software-defined storage controller that now manages the namespace. Alternatively, should the host fail to receive an acknowledgement of an input-output operation directed to the first software-defined storage controller over a period of time since transmission, the host may access a predetermined failover rule to identify another of the software-defined storage controllers that was previously designated to take over handling of input-output operations for the namespace in the event that the primary software-defined storage controller experienced a failure. In one option, the orchestration controller may be responsible for establishing and/or updating the failover rule for a given namespace to identify one or more software-defined storage controllers that may serve as a failover controller for the primary controller.

In some embodiments, the orchestration controller may beneficially accommodate a large number of small namespaces to increase the granularity of software-defined storage controller assignment, and may also assign multiple namespaces to be handled by one of the software-defined storage controllers. For example, the orchestration controller may assign one hundred or more small namespaces to be managed by a given one of the software-defined storage controllers. However, having segmented the storage array into namespaces that can be assigned to different software-defined storage controllers to manage, the orchestration controller may implement many topologies. In some embodiments, any integer number N of namespaces can be assigned to any integer number M of software-defined storage controllers, where N and M may be roughly the same scale. This flexibility allows any of the software-defined storage controllers to manage any of the namespaces that are accessible over the fabric (PCIe, Ethernet or otherwise) between the software-defined storage controllers and the storage devices that host the namespaces.

In some embodiments, fractions or subsets of the namespaces that have been managed by a software-defined storage controller experiencing a failure may be reassigned from the failed controller to multiple operational controllers. In other words, responsibility for handling the input-output operations for each namespace may be reassigned to a different operational controller, whether pre-existing or newly provisioned. While the namespaces previously managed by the failed controller may be reassigned to a single controller, the namespaces may also be independently assigned to different controllers. Automatically reassigning namespaces to one or more other controllers reduces the recovery time necessary to switch over from the failed controller. In addition, automatically reassigning namespaces to one or more other controllers reduces any performance loss of the storage solution in response to the failed controller. The orchestration controller may reassign the namespaces in an appropriate manner and quantity to other controllers to maintain performance of the storage solution at a level that is similar to the pre-failure performance. In some embodiments, the orchestration controller may provide a predetermined failover rule for each namespace, where the predetermined failover rule identifies which of the other software-defined storage controllers will take over management of the namespace following a failure of the software-defined storage controller that was most recently managing the namespace.

A failure of a software-defined storage controller may arise in at least two ways. First, the software of the software-defined storage controller may become stalled or the compute node running the software-defined storage controller may shutdown. Second, there may be a failure of a connectivity path through the host interconnect fabric between the host and the software-defined storage controller, or a failure of a connectivity path through the drive interface fabric between the software-defined storage controller and the namespace. In each of these circumstances, the host will be unable to complete an input-output operation with the namespace and the software-defined storage controller is deemed to have failed such that it is necessary to switch to a different software-defined storage controller that has not failed (i.e., is operational).

In some embodiments, the operations may further include establishing, for each of the plurality of namespaces, a failover list including an ordered list of software-defined storage controllers to manage the namespace, and causing, for each of the plurality of namespaces, input-output operations for the namespace to be handled by a highest-ranked software-defined storage controller on the failover list that is operational. For example, a failover rule may designate a primary controller (highest rank), a secondary controller (second rank), and a tertiary controller (third rank). Upon the failure of the primary controller for a namespace, then the secondary controller for the namespace may automatically take over management of the namespace. Similarly, if the secondary controller fails and the primary controller is still not operational, then the tertiary controller for the namespace may automatically take over management of the namespace. Such failover rules may be deterministic so that there is no doubt which controller will take over in response to a controller failure. In one option, the failover rule may cause a software-defined storage controller to take over handling the input-output operations for a namespace only if the controller is the highest-ranked software-defined storage controller on the failover list that is both operational and has a sufficient amount of available unused capacity for handling the input-output operations of the namespace. It is beneficial to maintain or achieve high availability to the namespace by assigning or re-assigning the namespace to a controller or CPU controller complex that has sufficient available capacity to handle the input and output operation for the namespace in order to maintain or achieve high availability to the namespace. Optionally, the amount or rate of input-output operations for the namespace may be tracked and stored for the purpose of determining whether or not a given software-defined storage controller has sufficient available capacity to handle the input and output operation for the namespace.

As discussed above, some embodiments may include a first software-defined storage controller handling input-output operations to and from the first namespace, and a second software-defined storage controller handling input-output operations to and from the second namespace. Accordingly, if the first software-defined storage controller is the highest-ranked operational software-defined storage controller on the failover list after the second software-defined storage controller, then the first (secondary) software-defined storage controller may be caused to take over handling of the input-output operations to and from the second namespace in response to failure of the second (primary) software defined controller.

In some embodiments, the operation may further include causing, in response to the second (primary) software-defined storage controller becoming operational after a failure, the second (primary) software-defined storage controller to take over handling input-output operations to and from the second namespace. In other words, after the first (secondary) software-defined storage controller has taken over management of the namespace for the failed second (primary) software-defined storage controller, management of the namespace may be returned to the second (primary) software-defined storage controller when the second (primary) software-defined storage controller is again operational.

In some embodiments, the failover list for each namespace may be provided to each of the software-defined storage controllers that are identified in the failover list for the namespace. Similarly, the failover list for each namespace may be provided to the host that is assigned to store data on the namespace. Accordingly, in response to failure of the a software-defined storage controller, any host that was directing input-output operations to a namespace via the failed software-defined storage controller may automatically begin directing subsequent input-output operations destined for the namespace to the highest-ranked software-defined storage controller on the ordered failover list that has a functional connectivity path over the drive interface fabric to the second namespace and a functional connectivity path over the host interconnect fabric to the second host. In one option, a host may determine that a failure of a software-defined storage controller has occurred in response to receiving no acknowledgement from the software-defined storage controller during a predetermined time period subsequent to transmitting an input-output operation to the software-defined storage controller.

In some embodiments, the orchestration controller may attempt to verify that a given host can access all controllers that are named in a failover rule for a namespace assigned to the host. If a given host can't reach a particular controller identified in the failover rule for a namespace belonging to the host, then the orchestration controller may modify the failover rule for that namespace to only include controllers that are accessible to the given host. Alternatively, any controller that is identified in a predetermined failover rule for a given namespace yet cannot be accessed by the host that owns the namespace may be skipped over in the event that the controller is next in line to manage the namespace. It is a benefit of some embodiments that each namespace has multiple backup controllers.

In some embodiments, the orchestration controller may reassign namespaces from a failed controller to a default controller if the initially designated failover controllers are either not functional at the time of failure or if the initially designated failover controllers are already at full capacity. The assignment of a namespace to a default controller may be temporary until another controller with greater capacity is available.

In some embodiment, the operations may further include selecting, in response to failure of the second software-defined storage controller, the first (failover) software-defined storage controller to take over handling of the input-output operations to and from the second host. The operation of selecting a failover controller may be performed immediately following the failure of the second software-defined storage controller. The failover controller that will take over handling of the input-output operations to and from the second namespace may be selected using various criteria, such as the software-defined storage controller having the greatest amount of unused capacity to handle additional input-output operations from among the plurality of software-defined storage controllers that are currently functional. While the orchestration controller may make this selection, another option is for the plurality of software-defined storage controllers to elect one of the plurality of software-defined storage controllers to handle the input out operations to and from the second namespace. Accordingly, the first software-defined storage controller may be caused to take over handling of the input-output operations to and from the second namespace in response to being elected. It should be recognized that an election could be performed to identify a single controller to take over all of the namespaces of the failed controller, or multiple elections could be performed where each election identifies a single controller that will take over management of one or more of the namespaces.

In some embodiments, the operations may further include causing the second software-defined storage controller to handle input-output operations between a third host and a third namespace. Then, in response to failure of the second software defined controller, a third software-defined storage controller may be caused to take over handling of the input-output operations to and from the third namespace, and the third host may be caused to direct input-output operations destined for the third namespace to the third software-defined storage controller. This is an example of the failure of a software-defined storage controller that normally manages multiple namespaces, wherein the namespaces (i.e., second and third namespaces) are independently reassigned to different software-defined storage controllers. Accordingly, the load on a failed controller may failover to multiple failover controllers, such as where each of the namespaces managed by the failed controller has their own failover rule that identifies the controller that should take over handling of input-output operations for the namespace. Potentially, management of each of the namespaces from the failed controller could be taken over by a different controller.

Some embodiments may provide improvements in the technology of data storage, especially on non-volatile memory devices such as NVMe disks. The use of software-defined storage controllers allows the number of active controllers to be increased by the orchestration controller as needed. Furthermore, the orchestration controller may provide namespaces that are small. The combined effect of a large number of software-defined storage controllers and a large number of namespaces is that the size of any failure domain is reduced and the impacts of a given controller failure are minimized. A "high availability zone" is defined by the entities that make up the availability group, such as a RAID group. Although a high availability zone may be created based on one or more physical storage devices, embodiments may create a high availability zone based on one or more much smaller, flexible namespaces. Increasing the high availability zone count results in a corresponding increase in granularity of the data storage solution and a reduction in the impact of a failed controller or failed connectivity path. The high availability zone count may be increased as high as the maximum number of namespaces supported by the NVMe device.

Some embodiments provide an apparatus comprising at least one non-volatile storage device storing program instructions and at least one processor configured to process the program instructions, wherein the program instructions are configured to, when processed by the at least one processor, cause the apparatus to perform various operations. The operations may include causing a non-volatile memory device to establish a plurality of namespaces including a first namespace and a second namespace, wherein each namespace is uniquely associated with at least a specific portion of the storage space of the non-volatile memory device, and assigning, for each of the plurality of namespaces, a host to access the namespace, including assigning a first host to access the first namespace and a second host to access the second namespace. The operations may further include establishing a plurality of software-defined storage controllers including a first software-defined storage controller and a second software-defined storage controller, wherein each software-defined storage controller has access to the plurality of namespaces over a drive interface fabric and has access to the hosts assigned to the plurality of namespaces over a host interconnect fabric. The operations may further include causing the first software-defined storage controller to handle input-output operations to and from the first namespace, and causing the second software-defined storage controller to handle input-output operations to and from the second namespace. Still further, the operations may include causing, in response to failure of the second software defined controller, the first software-defined storage controller to take over handling of the input-output operations to and from the second namespace, and causing, in response to failure of the second software-defined storage controller, the second host to direct input-output operations destined for the second namespace to the first software-defined storage controller.

FIG. 1 is a diagram of a computing system 10 including hosts 20, software-defined storage controllers 30, orchestration controller 40 and NVMe disks 50. The hosts 20 are able to access and communicate with at least a portion of the software-defined storage controllers 30 via a host interconnect fabric 12. Similarly, the software-defined storage controllers 30 are able to access and communicate with at least a portion of the NVMe disks 50 via a drive interface fabric 14.

The NVMe disks 50 are examples of non-volatile memory devices that providing provide data storage space for a host 20. Collectively, the plurality of NVMe disks 50 may be referred to as an NVMe storage complex 54. Each NVMe disk 50 has at least a specific portion of the storage space uniquely associated with one or more data storage namespace 52. The orchestration controller 40 may assign each individual namespace 52 to one of the hosts 20 for data storage and may assign one of the software-defined storage controllers 30 to manage the namespace 52 (i.e., handle input-output operations between a host 20 and the namespace 52 assigned to the host).

Although the controllers 30 are software-defined and the hosts 20 may be a software process or application, the controllers 30 and hosts 20 are each run on a compute node that is able to communicate over the host interconnect fabric 12. Similarly, the orchestration controller 40 may be software-defined and may run on a compute node that is able to communicate with both the controllers 30 and the hosts 20 over the host interconnect fabric 12. Furthermore, the compute nodes that run the orchestration controller 40 and the software-defined storage controllers 30 are able to access the namespaces 52 on the NVMe disks 50 within the NVMe storage complex 54.

The orchestration controller may maintain a namespace to controller table that stores the association between a namespace and the controller that manages the namespace. In some embodiments, the namespace to controller table may be as simple as a set of records, each record storing the association between a namespace and a controller. However, some embodiments of the namespace to controller table may further include a predetermined failover rule for any one or more of the namespaces. For example, each record may identify a namespace, a primary software-defined storage controller that is logically assigned to handle input-output data storage operations to and from the namespace, and at least a secondary controller to handle input-output data storage operations to and from the namespace in response to a failure of the primary software-defined storage controller. Each record in the namespace to controller table may include any number of failover controllers in an ordered list that will take over management of the namespace in the event of one or more controller failures that leave the failover controller being the highest-ranked operational controller in the ordered list. The failover rule for any given namespace may identify the same number or a different number of software-defined storage controllers.

Figure 2:
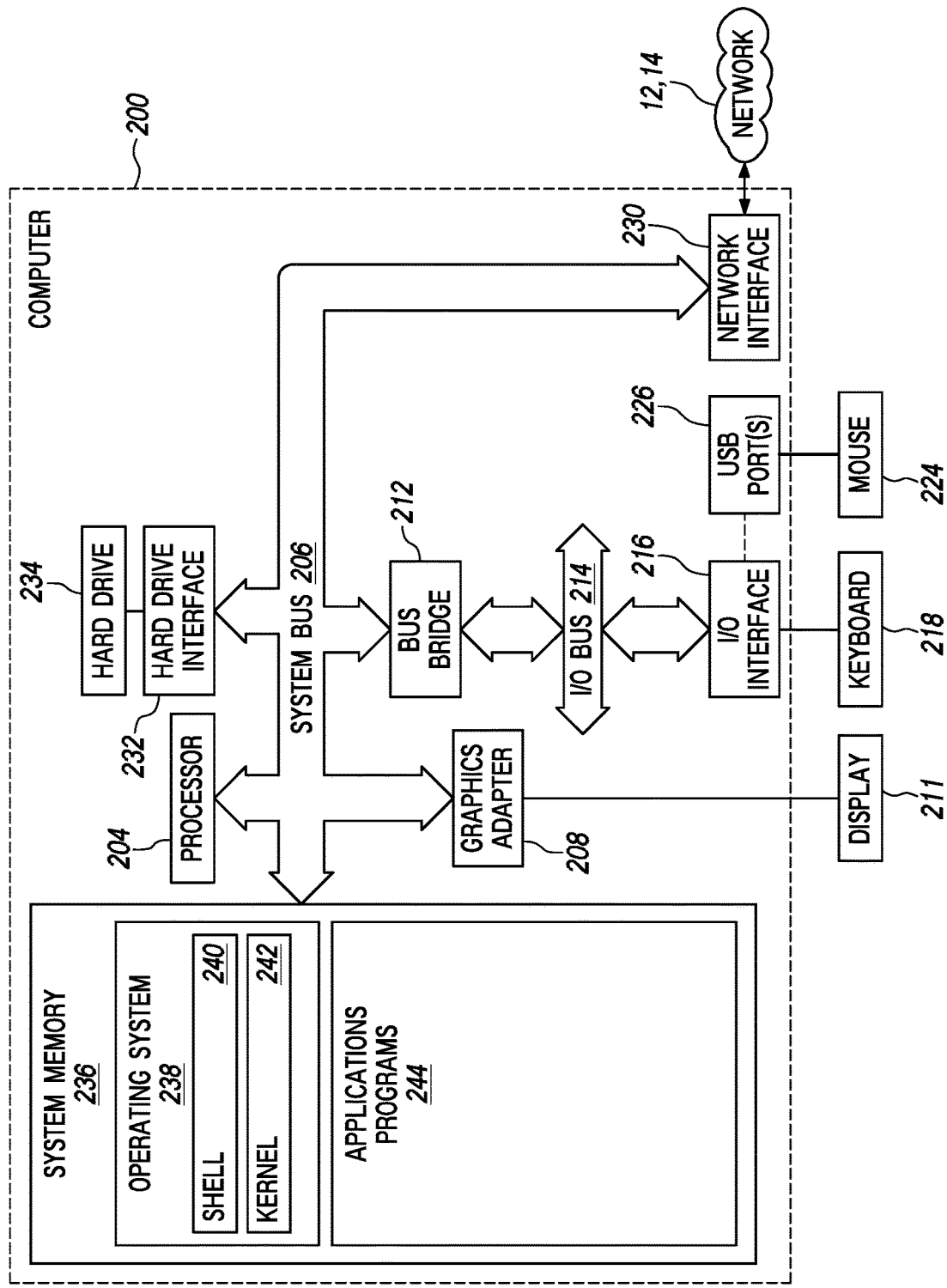
FIG. 2 is a diagram of a computer that is representative of a computer that may run either the host or the software-defined storage controller according to some embodiments.

FIG. 2 is a diagram of a computer 200 that is representative of a computer that may run either a host process 20, a software-defined storage controller 30, or an orchestration controller 40 shown in FIG. 1. Depending upon the implementation, these applications 20, 30, 40 may run directly on an operating system 238 or in a virtual machine supported by a hypervisor (not shown).

The computer 200 includes a processor unit 204 that is coupled to a system bus 206. The processor unit 204 may utilize one or more processors, each of which has one or more processor cores. A graphics adapter 208, which drives/supports a display 211, may also be coupled to the system bus 206. The graphics adapter 208 may, for example, include a graphics processing unit (GPU). The system bus 206 is coupled via a bus bridge 212 to an input/output (I/O) bus 214 and an I/O interface 216 is coupled to the I/O bus 214. The I/O interface 216 may facilitate communication with various I/O devices, such as a keyboard 218 (such as a touch screen virtual keyboard) and a USB mouse 224 via USB port(s) 226 (or other type of pointing device, such as a trackpad). As depicted, the computer 200 is able to communicate with other network devices over a network, such as the host interconnect fabric 12 and/or the drive interface fabric 14 of FIG. 1, using a network adapter or network interface controller 230.

A hard drive interface 232 is also coupled to the system bus 206 and the hard drive interface 232 interfaces with a hard drive 234. In some embodiments, the hard drive 234 communicates with system memory 236, which is also coupled to the system bus 206. System memory is defined as a lowest level of volatile memory in the computer 200. This volatile memory includes additional higher levels of volatile memory (not shown), including, but not limited to, cache memory, registers and buffers. Data that populates the system memory 236 includes the operating system (OS) 238 and application programs 244. In some embodiments, the system memory may include a hypervisor to support one or more virtual machine. The hardware elements depicted in the computer 200 are not intended to be exhaustive, but rather are representative. For instance, the computer 200 may include non-volatile memory and the like.

The operating system 238 includes a shell 240 for providing transparent user access to resources such as application programs 244. Generally, the shell 240 is a program that provides an interpreter and an interface between the user and the operating system. More specifically, the shell 240 executes commands that are entered into a command line user interface or from a file. Thus, the shell 240, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while the shell 240 may be a text-based, line-oriented user interface, embodiments may support other user interface modes, such as graphical, voice, gestural, etc.

As depicted, the operating system 238 also includes the kernel 242, which includes lower levels of functionality for the operating system 238, including providing essential services required by other parts of the operating system 238 and application programs 244. Such essential services may include memory management, process and task management, disk management, and mouse and keyboard management. As shown, the computer 200 includes application programs 244 in the system memory of the computer 200. The application programs 244 may include, without limitation, a host process, orchestration controller application, or software-defined storage controller application.

Figure 3:
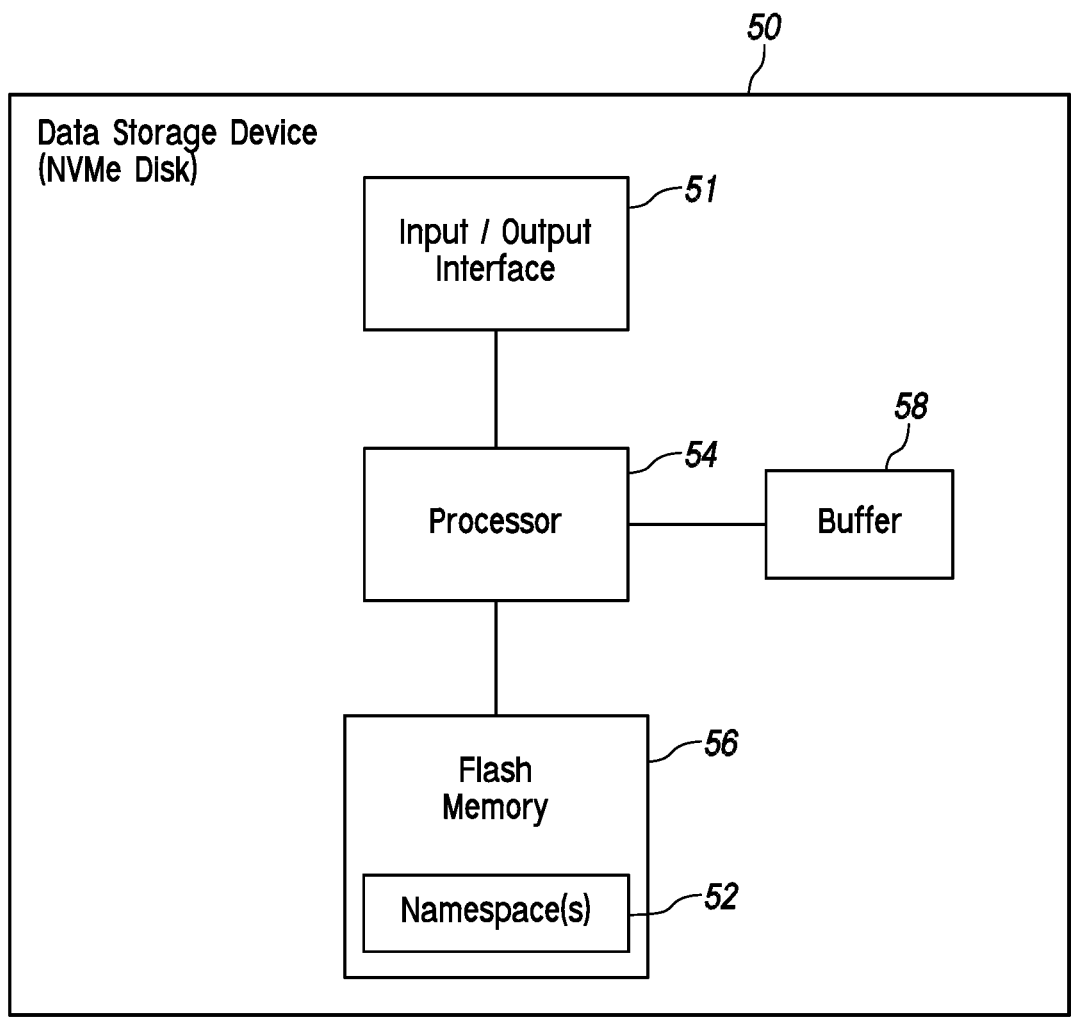
FIG. 3 is a diagram of a data storage device such as a Non-Volatile Memory Express (NVMe) Disk that may store data in namespaces for one or more of the hosts.

FIG. 3 is a diagram of a data storage device such as a Non-Volatile Memory Express (NVMe) disk 50 that may store data in namespaces for one or more of the hosts.

The NVMe disk 50 includes a processor 54 in communication with an input/output interface 51 for communicating with one or more software-defined storage controller and perhaps the orchestration controller. The processor 54 is connected to a buffer 58, which may be random-access memory (DRAM). The processor 54 is also connected to non-volatile data storage media 56, which may be flash memory.

Figure 4A:
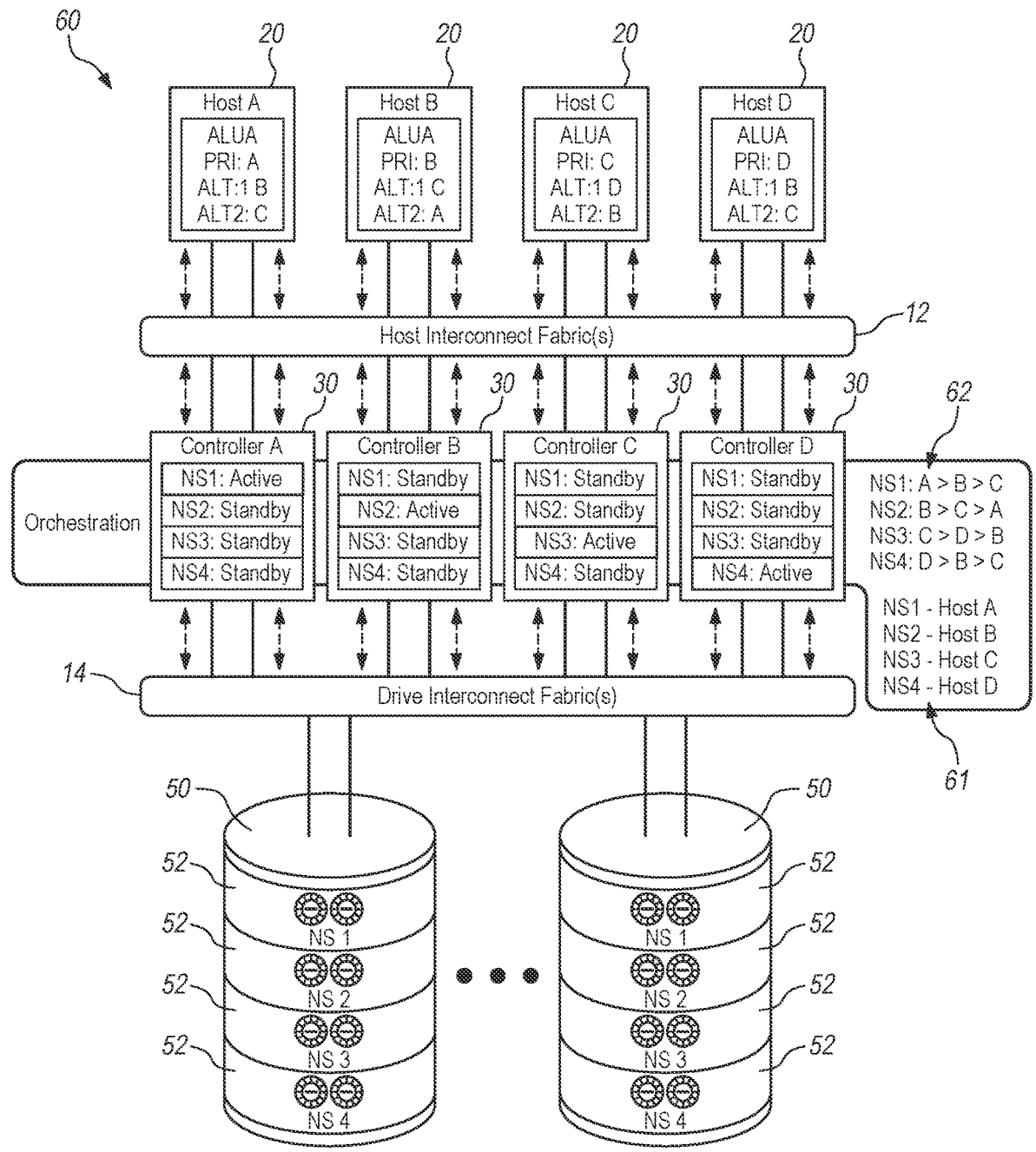
FIG. 4A is a diagram of a computing system having four hosts, four software-defined storage controllers, and any number of NVMe disks or other forms of NVMe data storage devices.

FIG. 4A is a diagram of a computing system 60 including hosts 20, software-defined storage controllers 30, and NVMe disks 50 or other forms of NVMe data storage devices. In this non-limiting illustration, there are four hosts 20 referred to as Host A, Host B, Host C and Host D; there are four software-defined storage controllers 30 referred to as Controller A, Controller B, Controller C and Controller D; and there are four namespaces 52 referred to as NS1, NS2, NS3 and NS4. As shown by a namespace to host assignment table 61, NS1 is assigned to Host A, NS2 is assigned to Host B, NS3 is assigned to Host C, and NS4 is assigned to Host D.

An orchestration controller (not shown; see FIG. 1) has established a set of failover rules 62, including one failover rule or record for each namespace 52. These failover rules may be made known to all of the software-defined storage controllers 30 and may be made known to all of the hosts 20. For a given namespace, the failover rule for the namespace may identify a primary software-defined storage controller and one or more standby (failover) software-defined storage controller. As shown, each failover rule may include an ordered list of software-defined storage controllers. For example, NS4 has a failover rule ("NS4: D→B→C") that identifies Controller D as the primary controller, Controller B as the secondary ($2^{nd}$ priority) controller, and Controller C as a tertiary ($3^{rd}$ priority) controller. Since all of the four controllers 30 are operational (i.e., none of the four controllers has failed), NS1 is being managed by its primary controller Controller A, NS2 is being managed by its primary controller Controller B, NS3 is being managed by its primary controller Controller C, NS4 is being managed by its primary controller Controller D.

Figure 4B:
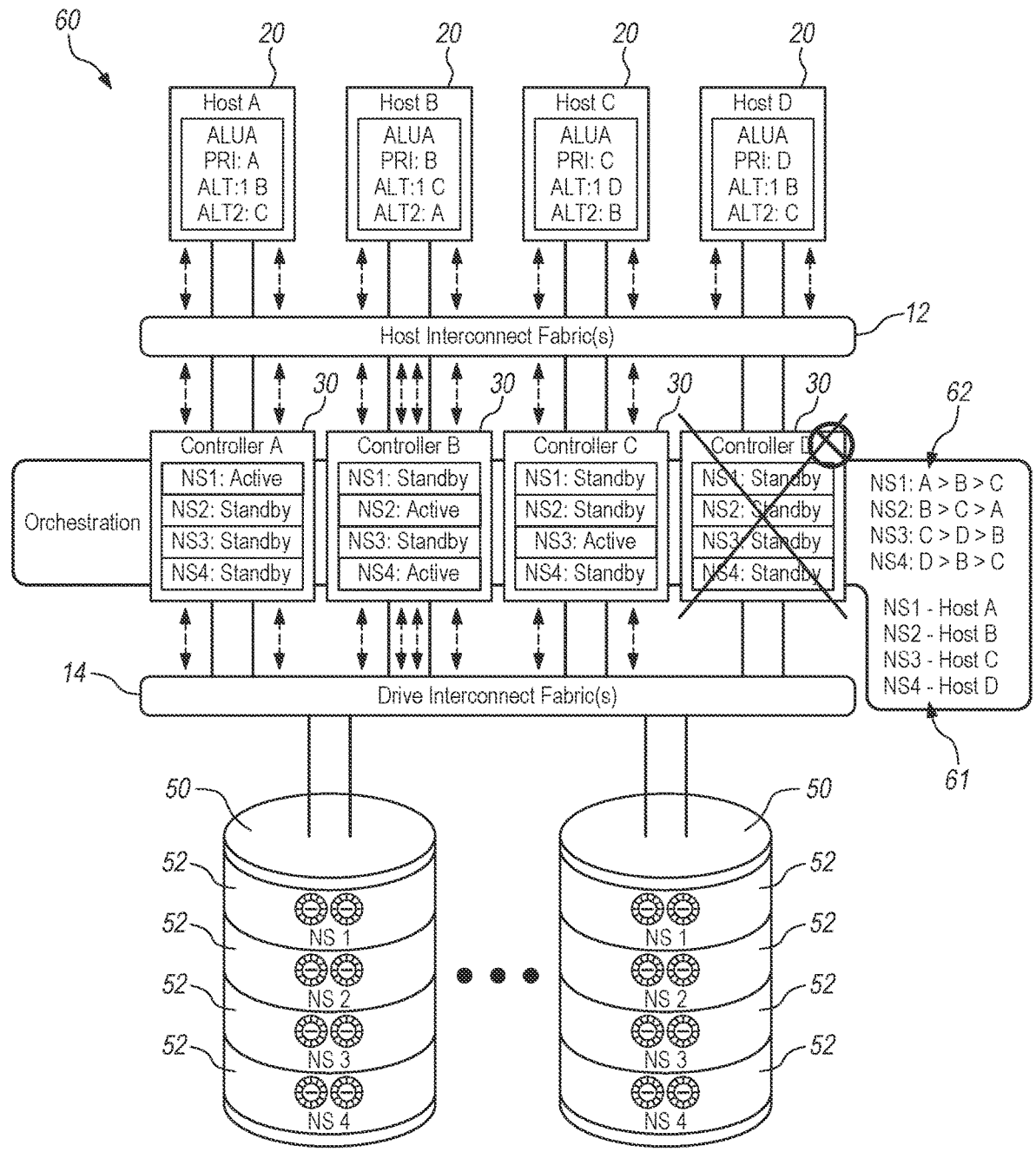
FIG. 4B is a diagram of the computing system of FIG. 4A illustrating a failure of a first one of the software-defined storage controllers (controller D).

FIG. 4B is a diagram of the computing system 60 of FIG. 4A illustrating a failure of a first one of the software-defined storage controllers (Controller D). At the time that Controller D fails, the only namespace being managed by Controller D is NS4 (see FIG. 4A). Accordingly, the failover rule for NS4 (i.e., "NS4: D→B→C") is accessed in order to determine that NS4 should failover to its secondary controller Controller B. As a result, Controller B is now illustrated as the active controller for both NS2 and NS4.

Host D will no longer be able to access the namespace NS4 through the failed Controller D. So, Host D may access the failover rules, such as a stored local copy of the failover rules for the namespaces assigned to Host D, in order to identify where to direct subsequent input-output operations to NS4. Alternatively, Host D may use existing NVMe methods to rediscover the active controller for the NS4. For example, Host D may use NVMe multipathing, such as defined by an Asymmetric Namespace Access (ANA) approach, which is similar to the older SCSI protocol method known as Asymmetric Logical Unit Access (ALUA).

The failure of a software-defined storage controller may be detected by a host when the current active controller fails to respond to a read or write request directed at a namespace being managed by the active controller. Optionally, the host may have a list of controllers (such as a set of failover rules) so that the client device may attempt to connect with a secondary controller when the primary controller has failed to respond. The secondary controller may have a polling algorithm and election process in place that provides logical confidence that the secondary controller can assume management of the namespace. The secondary controller may also redirect the host back to the primary controller if the secondary controller determines that the primary controller is actually operational or redirect the host to yet an alternate controller if the secondary controller determines that the alternate controller should manage the namespace.

Each controller may store a comprehensive set of all failover rules for all of the controllers, or may only store the failover rules that identify the controller as a failover controller for a namespace. Upon detecting failure of the failed controller, each other controller may first look in its copy of the namespace to controller table to identify the namespaces that must be reassigned, then look in its copy of the failover rules to determine whether the controller should take responsibility for one or more of those identified namespaces. Of course, if the applicable failover rule identifies a controller that is not operational, then the next controller identified in the failover rule should be used. As an alternative to each controller having an independent copy of a namespace to controller table and/or failover rules, each controller may either query or receive instructions from the orchestration controller to reach the same result. In this alternative, the orchestration controller may detect the failure of a given controller, apply the failover rules to identify the controller that should take over management of a particular one of the namespaces, then instruct the identified controller to begin managing the particular namespace. If the failed controller was managing multiple namespaces, then the storage controller application may send out instructions to multiple controllers, each instruction being directed to a particular controller identifying one or more of the namespaces that should now be managed by the particular controller.

Figure 4C:
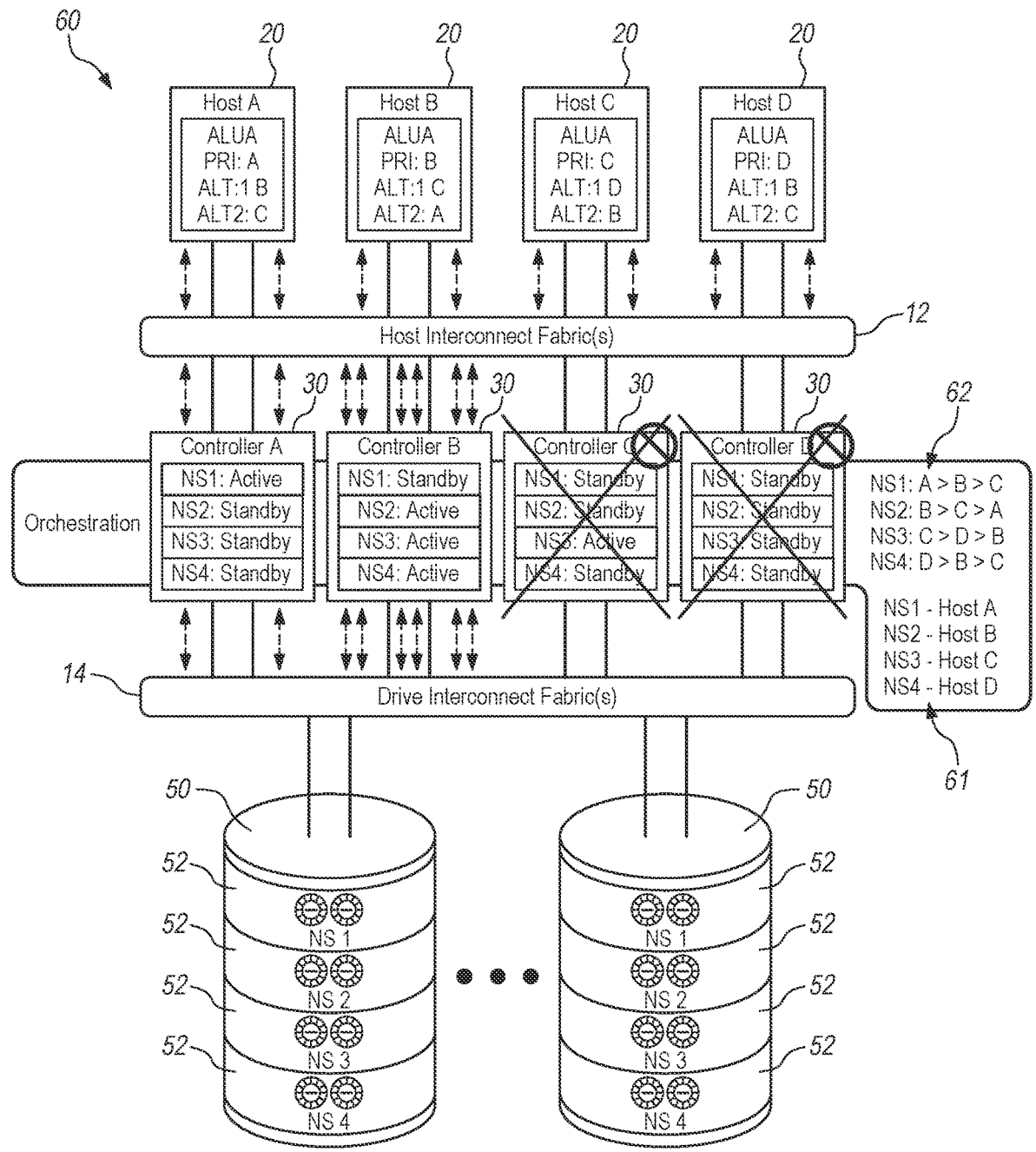
FIG. 4C is a diagram of the computing system of FIG. 4B illustrating a failure of a second one of the software-defined storage controllers (controller C).

FIG. 4C is a diagram of the computing system of FIG. 4B illustrating a failure of a second one of the software-defined storage controllers (controller C). In response to the Host C detecting that the second controller failure (i.e., the failure of controller C), Host C may access the failover rules to provide continued access to the namespaces. Since Controller C was the active controller for NS3 (see FIG. 4A), Host C may use the failover rules for NS3 (NS3: C→D→B). In this illustration, it has just been detected that controller C (the primary controller for NS3) has failed, and Controller D (the secondary controller for NS3) had previously failed and has not yet become functional. So, the failover rule identifies that NS3 should then be assigned to Controller B. Controller B then becomes the active controller for NS2, NS3 and NS4.

Should either Controller C or Controller D comes back online, a failback may occur and the same host discovery methods would be performed to discover that the namespace is now again available via the primary controller or any controller that is the highest ranked controller in the failover rule. In the foregoing illustrations, each host has a network connection to all of the controllers identified in the failover rule for the namespace assigned to the host. While more connections allow for more flexibility, it is certainly possible that a given host may only have access to a subset of the controllers. In this situation, either the failover rules are established to only include controllers that the host can access or the host will skip over any controller that is not operational and accessible to the host.

As will be appreciated by one skilled in the art, embodiments may take the form of a system, method or computer program product embodied in one or more computer readable medium(s) having computer readable program code embodied thereon. This may be the same or different computer readable medium(s) that embody data associated with the computer program product. Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer readable medium and non-transitory program instructions embodied therein, the program instructions being configured to be executable by a processor to cause the processor to perform operations comprising:

causing a non-volatile memory device to establish a plurality of namespaces including a first namespace and a second namespace, wherein each namespace is uniquely associated with at least a specific portion of a storage space of the non-volatile memory device;

assigning, for each of the plurality of namespaces, a host to access the namespace, including assigning a first host to access the first namespace and a second host to access the second namespace;

establishing a plurality of software-defined storage controllers including a first software-defined storage controller and a second software-defined storage controller, wherein each software-defined storage controller has access to the plurality of namespaces over a drive interface fabric and has access to the hosts assigned to the plurality of namespaces over a host interconnect fabric;

causing the first software-defined storage controller to handle input-output operations to and from the first namespace;

causing the second software-defined storage controller to handle input-output to and from the second namespace;

causing, in response to failure of the second software defined controller, the first software-defined storage controller to take over handling of the input-output operations to and from the second namespace; and causing, in response to failure of the second software-defined storage controller, the second host to direct input-output operations destined for the second namespace to the first software-defined storage controller.

2. The computer program product of claim 1, the operations further comprising:

establishing, for each of the plurality of namespaces, a predetermined failover list including an ordered list of software-defined storage controllers to manage the namespace; and causing, for each of the plurality of namespaces, input-output operations for the namespace to be handled by a highest-ranked software-defined storage controller on the failover list that is operational.

3. The computer program product of claim 2, the operations further comprising:

detecting the failure of the second software-defined storage controller, wherein causing, in response to failure of the second software defined controller, the first software-defined storage controller to take over handling of the input-output operations to and from the second namespace includes instructing a highest-ranked operational software-defined storage controller on the failover list to take over handling input-output operations for the second software-defined storage controller.

4. The computer program product of claim 2, the operations further comprising:
causing, in response to the second software-defined storage controller becoming operational after a failure, the second software-defined storage controller to take over handling input-output operations to and from the second namespace.

5. The computer program product of claim 2, the operations further comprising:
providing, for each of the plurality of namespaces, the failover list for the namespace to each of the software-defined storage controllers that are identified in the failover list for the namespace.

6. The computer program product of claim 2, wherein the ordered list of software-defined storage controllers to manage the namespace includes a primary software-defined storage controller, a secondary software-defined storage controller, and a tertiary software-defined storage controller.

7. The computer program product of claim 2, the operations further comprising:
providing, for each of the plurality of namespaces, the failover list for the namespace to the host that is assigned to store data on the namespace, wherein causing, in response to failure of the second software-defined storage controller, the second host to automatically direct input-output operations destined for the second namespace to the first software-defined storage controller includes causing the second host to direct input-output operations destined for the namespace to a highest-ranked software-defined storage controller on the ordered list that has a functional connectivity path over the drive interface fabric to the second namespace and the host interconnect fabric to the second host.

8. The computer program product of claim 7, the operations further comprising:
the second host determines that a failure of the second software-defined storage controller has occurred in response to receiving no acknowledgement from the second software-defined storage controller during a predetermined time period subsequent to transmitting an input-output operation to the second software-defined storage controller.

9. The computer program product of claim 1, the operations further comprising:
establishing, for each of the plurality of namespaces, a predetermined failover list including an ordered list of software-defined storage controllers to manage the namespace; and
causing, for each of the plurality of namespaces, input-output operations for the namespace to be handled by a highest-ranked software-defined storage controller on the predetermined failover list that is both operational and has a sufficient amount of available unused capacity for handling the input-output operations of the namespace.

10. The computer program product of claim 1, wherein the failure of the second software-defined storage controller is selected from an operational failure of the software-defined storage controller, a failure of a connectivity path through the host interconnect fabric between the second host and the second software-defined storage controller, and a failure of a connectivity path through the drive interface fabric between the second software-defined storage controller and the second namespace.

11. The computer program product of claim 1, the operations further comprising:
selecting, in response to failure of the second software-defined storage controller, the first software-defined storage controller to take over handling of the input-output operations to or from the second namespace.

12. The computer program product of claim 11, wherein the first software-defined storage controller is selected for having a greatest amount of unused capacity to handle additional input-output operations among the plurality of software-defined storage controllers that are currently functional.

13. The computer program product of claim 1, the operations further comprising:
causing the plurality of software-defined storage controllers to elect one of the plurality of software-defined storage controllers to handle the input-output operations to and from the second namespace, wherein the first software-defined storage controller is caused to take over handling of the input-output operations to and from the second namespace in response to being elected.

14. The computer program product of claim 1, the operations further comprising:
causing the second software-defined storage controller to handle input-output operations to and from a third namespace;
causing, in response to failure of the second software defined controller, a third software-defined storage controller to take over handling of the input-output operations to and from the third namespace; and
causing, in response to failure of the second software-defined storage controller, a third host to direct input-output operations destined for the third namespace to the third software-defined storage controller.

15. The computer program product of claim 14, the operations further comprising:
establishing, for each of the plurality of namespaces, a predetermined failover list including an ordered list of software-defined storage controllers to manage the namespace, wherein the predetermined failover list for the second namespace includes the second software-defined storage controller as a primary controller and the first software-defined storage controller as a secondary controller, and wherein the predetermined failover list for the third namespace includes the second software-defined storage controller as a primary controller and the third software-defined storage controller as a secondary controller.

16. An apparatus, comprising:
at least one non-volatile storage device storing program instructions; and
at least one processor configured to process the program instructions,
wherein the program instructions are configured to, when processed by the at least one processor, cause the apparatus to perform operations comprising:
causing a non-volatile memory device to establish a plurality of namespaces including a first namespace and a second namespace, wherein each namespace is uniquely associated with at least a specific portion of the storage space of the non-volatile memory device;
assigning, for each of the plurality of namespaces, a host to access the namespace, including assigning a first host to access the first namespace and a second host to access the second namespace;

establishing a plurality of software-defined storage controllers including a first software-defined storage controller and a second software-defined storage controller, wherein each software-defined storage controller has access to the plurality of namespaces over a drive interface fabric and has access to the hosts assigned to the plurality of namespaces over a host interconnect fabric;

causing the first software-defined storage controller to handle input-output operations to and from the first namespace;

causing the second software-defined storage controller to handle input-output to and from the second namespace;

causing, in response to failure of the second software defined controller, the first software-defined storage controller to take over handling of the input-output operations to and from the second namespace; and causing, in response to failure of the second software-defined storage controller, the second host to direct input-output operations destined for the second namespace to the first software-defined storage controller.

17. The apparatus of claim 16, the operations further comprising:

establishing, for each of the plurality of namespaces, a predetermined failover list including an ordered list of software-defined storage controllers to manage the namespace; and causing, for each of the plurality of namespaces, input-output operations for the namespace to be handled by a highest-ranked software-defined storage controller on the failover list that is operational.

18. A computer program product comprising a non-transitory computer readable medium and non-transitory program instructions embodied therein, the program instructions being configured to be executable by a processor to cause the processor to perform operations comprising:

causing a non-volatile memory device to establish a plurality of namespaces, wherein each namespace is uniquely associated with at least a specific portion of a storage space of the non-volatile memory device;

assigning, for each of the plurality of namespaces, a host to access the namespace;

establishing a plurality of software-defined storage controllers, wherein each software-defined storage controller has access to the plurality of namespaces over a drive interface fabric and has access to the host assigned to each of the plurality of namespaces over a host interconnect fabric;

establishing, for each of the plurality of namespaces, a predetermined failover list including an ordered list of software-defined storage controllers to manage the namespace;

causing, for each of the plurality of namespaces, input-output operations for the namespace to be handled by a highest-ranked software-defined storage controller on the predetermined failover list that is operational; and causing, for each of the plurality of namespaces, the assigned host to direct the input-output operations destined for the namespace to the highest-ranked software-defined storage controller on the predetermined failover list that is operational.

19. The computer program product of claim 18, the operations further comprising:

providing, for each of the plurality of namespaces, the predetermined failover list for the namespace to each of the software-defined storage controllers that are identified in the failover list for the namespace before failure of any of the software-defined storage controllers that are identified the failover list; and providing, for each of the plurality of namespaces, the predetermined failover list for the namespace to the host that is assigned to store data on the namespace before failure of any of the software-defined storage controllers that are identified the failover list.

20. The computer program product of claim 18, wherein the input-output operations for multiple namespaces are handled by a particular one of the software-defined storage controllers, and wherein, in response to failure of the particular software-defined storage controller, the predetermined failover lists for the multiple namespaces cause the multiple namespaces to be reassigned to different software-defined storage controllers.

* * * * *